(12) United States Patent
Baldemair et al.

(10) Patent No.: US 10,447,515 B2
(45) Date of Patent: Oct. 15, 2019

(54) MODULATION FOR A WIRELESS COMMUNICATION NETWORK

(71) Applicant: Telefonaktiebolaget LM Ericsson (publ), Stockholm (SE)

(72) Inventors: Robert Baldemair, Solna (SE); Kumar Balachandran, Pleasanton, CA (US); Erik Dahlman, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/575,674

(22) PCT Filed: May 21, 2015

(86) PCT No.: PCT/SE2015/050587
§ 371 (c)(1),
(2) Date: Nov. 20, 2017

(87) PCT Pub. No.: WO2016/186544
PCT Pub. Date: Nov. 24, 2016

(65) Prior Publication Data
US 2018/0287838 A1  Oct. 4, 2018

(51) Int. Cl.
*H04L 27/10* (2006.01)
*H04L 27/12* (2006.01)
(Continued)

(52) U.S. Cl.
CPC .............. *H04L 27/10* (2013.01); *H04L 27/12* (2013.01); *H04L 27/14* (2013.01); *H04L 27/16* (2013.01);
(Continued)

(58) Field of Classification Search
CPC ...................................................... H04L 27/10
(Continued)

(56) References Cited

U.S. PATENT DOCUMENTS 5,903,546 A * 5/1999 Ikeda .................... H04L 1/0054
370/232
7,920,645 B2 * 4/2011 Golitschek Edler Von
Elbwart .................. H04L 27/34
375/298

(Continued)

FOREIGN PATENT DOCUMENTS

WO          2007 014377 A2      2/2007

OTHER PUBLICATIONS

FQAM: A Modulation Scheme for Beyond 4G Cellular Wireless Communication Systems by Sungnam Hong et al.; Globecom 2013 Workshop—Emerging Technologies for LTE-Advanced and Beyond-4G—IEEE 2013.

(Continued)

*Primary Examiner* — Lihong Yu
(74) *Attorney, Agent, or Firm* — Patent Portfolio Builders, PLLC

(57) ABSTRACT

There is disclosed a method for operating a wireless device in a wireless communication network, the method comprising modulating a plurality of input bits (N), wherein modulating comprises choosing a first number (k) of frequencies from a predetermined set of a total number (NF) of frequencies, the first number (k) being larger than 1, and performing quadrature amplitude modulation to a second number (NQ) on each of the first number (k) of frequencies. There are further disclosed related methods and devices.

18 Claims, 9 Drawing Sheets

(51) Int. Cl.
- *H04L 27/14* (2006.01)
- *H04L 27/16* (2006.01)
- *H04L 27/32* (2006.01)
- *H04L 27/34* (2006.01)
- *H04L 27/36* (2006.01)
- *H04L 27/38* (2006.01)
- *H04L 27/30* (2006.01)
- *H04L 5/00* (2006.01)
- *H04L 27/26* (2006.01)

(52) U.S. Cl.
CPC .............. *H04L 27/30* (2013.01); *H04L 27/32* (2013.01); *H04L 27/34* (2013.01); *H04L 27/3405* (2013.01); *H04L 27/345* (2013.01); *H04L 27/36* (2013.01); *H04L 27/362* (2013.01); *H04L 27/38* (2013.01); *H04L 5/003* (2013.01); *H04L 5/0044* (2013.01); *H04L 27/2602* (2013.01); *H04L 27/3472* (2013.01)

(58) Field of Classification Search
USPC ........................................................ 375/298
See application file for complete search history.

(56) References Cited

U.S. PATENT DOCUMENTS

| | | | | |
|---|---|---|---|---|
| 2007/0058745 | A1* | 3/2007 | Watanabe | H04L 25/03171 375/264 |
| 2008/0159449 | A1* | 7/2008 | Tian | H04L 27/2657 375/346 |
| 2013/0294387 | A1* | 11/2013 | Tanaka | H04W 72/1289 370/329 |
| 2014/0269959 | A1 | 9/2014 | Lim et al. | |

OTHER PUBLICATIONS

Hybrid QAM—FSK (HQFM) OFDM Transceiver With Low PAPR by Asma Latif; A dissertation submitted to Faculty of Electronic Engineering in partial fulfillment of the requirements for the degree of Doctor of Philosophy—Jan. 2009 (due to size, this document has been split into two parts).

PCT International Search Report for International application No. PCT/SE2015/050587—dated Jan. 21, 2016.

PCT Written Opinion of the International Searching Authority for International application No. PCT/SE2015/050587—dated Jan. 21, 2016.

* cited by examiner

MODULATION FOR A WIRELESS COMMUNICATION NETWORK

PRIORITY

This nonprovisional application is a U.S. National Stage Filing under 35 U.S.C. § 371 of International Patent Application Serial No. PCT/SE2015/050587 filed May 21, 2015, and entitled "Modulation For A Wireless Communication Network" which is hereby incorporated by reference in its entirety.

TECHNICAL FIELD

This disclosure pertains to wireless communication, in particular to modulation techniques for wireless communication.

BACKGROUND

Use and spread of wireless communication, in particular such using cellular technology, is growing and is expected to keep on growing in the near and not-so-near future. However, spectral resources to support the increased use are limited. One approach of improving support is to improve the spectral efficiency of wireless data transmission, such that a given (frequency) spectrum (e.g., a spectrum licensed for communication) can be used to transfer more data in a given time.

SUMMARY

It is an object of this disclosure to describe approaches for modulating signals providing efficient data transfer, in particular in terms of data volume over time, and/or good spectral efficiency.

There is disclosed a method for operating a wireless device in a wireless communication network, the method comprising modulating a plurality of input bits (N), wherein modulating comprises choosing a first number (k) of frequencies from a predetermined set of a total number (NF) of frequencies, the first number (k) being larger than 1, and performing quadrature amplitude modulation to a second number (NQ) on each of the first number (k) of frequencies.

There is also disclosed a wireless device for a wireless communication network, the wireless device being adapted for modulating a plurality of input bits (N), wherein modulating comprises choosing a first number (k) of frequencies from a predetermined set of a total number (NF) of frequencies, the first number (k) being larger than 1, and performing quadrature amplitude modulation to a second number (NQ) on each of the first number (k) of frequencies.

Moreover, there is disclosed a method for operating a wireless device in a wireless communication network, the method comprising demodulating a received signal representing a plurality of input bits (N), wherein demodulating is based on a first number (k) of frequencies chosen from a predetermined set of a total number (NF) of frequencies, the first number (k) being larger than 1, and performing quadrature amplitude demodulation with to second number (NQ) on each of the first number (k) of frequencies.

A wireless device for a wireless communication network is further disclosed. The wireless device is adapted for demodulating a received signal representing a plurality of input bits (N), wherein demodulating is based on a first number (k) of frequencies chosen from a predetermined set of a total number (NF) of frequencies, the first number (k) being larger than 1, and performing quadrature amplitude demodulation to a second number (NQ) on each of the first number (k) of frequencies.

Moreover, a program product comprising code executable by control circuitry is disclosed, the code being adapted to cause the control circuitry to control and/or perform any of the methods disclosed herein.

In addition, there is disclosed herein a storage medium storing a program product as disclosed herein and/or storing code executable by control circuitry, the code being adapted to cause the control circuitry to control and/or perform any of the methods disclosed herein.

The described approaches allow the combination of frequency modulation with QAM, increasing the peak spectral efficiency of signaling.

DETAILED DESCRIPTION

Figure 1:
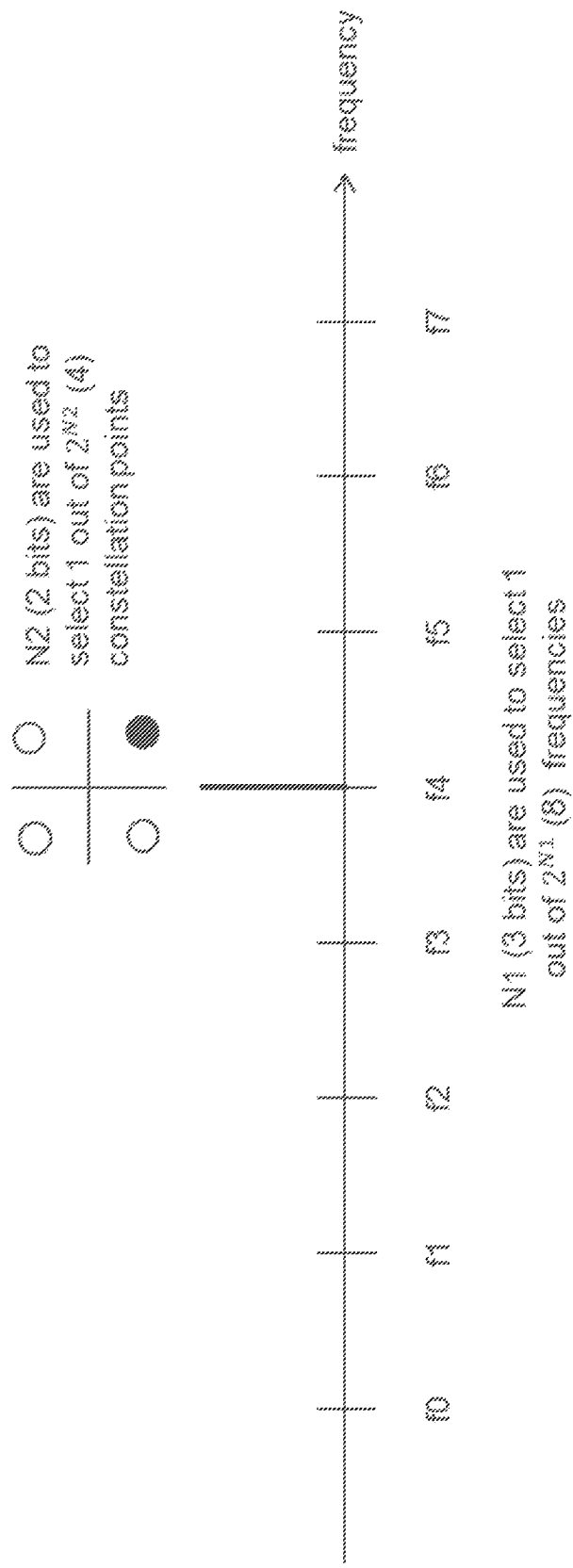
FIG. 1 shows an example of FQAM.

In the context of this disclosure, a wireless communication network may be a communication network set up for radio communication between devices or nodes. A device adapted for wireless and/or radio communication may be considered a wireless device. A wireless device in particular may be a terminal or user equipment, or a network node like a base station. A base station may be in particular an eNodeB (eNB). Wireless or radio communication may be in particular performed according to a telecommunications standard like LTE and/or be cellular communication, which may be based on cells defined and/or provided and/or controlled and/or served by a network, in particular by one or more network nodes (radio nodes) of the network, e.g. one or more base stations or eNBs.

For wireless communication, in particular transmission, (digital) information (e.g., in the form of bits or signal bits), may be mapped onto a frequency spectrum (of at least one carrier frequency with an associated bandwidth) to provide a signal, usually by modulation. The signal, when received, is demodulated to retrieve the input bits. The input bits may generally comprise a wide variety of information, e.g. user data, control information, error correction and detection bits, etc. For modulating (demodulating can be seen as reverse process of modulating and thus is mostly analogous), there are different approaches, which generally either change the amplitude of a carrier wave having the carrier frequency or (slightly) change its frequency to represent the input bits.

There is disclosed a method for operating a wireless device in a wireless communication network, the method comprising modulating a plurality of input bits (N), wherein modulating comprises choosing a first number (k) of frequencies from a predetermined set of a total number (NF) of frequencies, the first number (k) being larger than 1, and performing quadrature amplitude modulation to a second number (NQ) on each of the first number (k) of frequencies. The wireless device may in particular be a transmitting device, e.g. a base station or eNB. The method may comprise transmitting a signal, e.g. a modulated signal, which may be based on the modulating. The signal may be carried on a (modulated) carrier frequency There is also disclosed a wireless device for a wireless communication network, the wireless device being adapted for, and/or comprising a modulating module for, modulating a plurality of input bits (N), wherein modulating comprises choosing a first number (k) of frequencies from a predetermined set of a total number (NF) of frequencies, the first number being larger than 1, and performing quadrature amplitude modulation to a second number (NQ) on each of the first number of frequencies. The wireless device may in particular be a transmitting device, e.g. a base station or eNB. The wireless device may be adapted for transmitting a signal, e.g. a modulated signal, in particular based on the modulating, and/or which may represent the input bits. The signal may be carried on a (modulated) carrier frequency Modulating may generally comprise mapping information, e.g. input bits, onto a carrier frequency, e.g. by shifting the amplitude and/or frequency, in particular according to one or more prescribed modulating schemes. A wireless device, in particular a transmitting device, may be configured for modulating, e.g. by the network and/or a network node like a base station or eNodeB. Performing QAM modulating to a second number NQ may comprise and/or refer to mapping utilizing QAM modulation and/or determining a corresponding constellation of QAM to represent a maximum number of NQ and/or to a maximum number of bits (N2) representing NQ. A number of bits representing another number may generally be the number of bits necessary to represent the number in binary notation. Modulating may generally comprise mapping to a symbol and/or result in a signal or symbol.

A signal may represent the input bits and/or may generally be transmitted and/or carried on the carrier frequency, which may be modulated accordingly. Modulating may be considered to map the input bits onto a symbol, which may be carried on the carrier frequency. The symbol may have a (pre-determined) length in time, which may e.g. pre-determined by a standard. The number of bits (input bits) mapped to a symbol may be dependent on the modulation schemes used for modulation. Different modulation schemes may map different numbers of bits into a symbol. A plurality of symbols may be modulated and/or demodulated, to map a number of input bits larger than the number of bits a symbol may represent.

Moreover, there is disclosed a method for operating a wireless device in a wireless communication network, the method comprising demodulating a received signal representing a plurality of input bits (N), wherein demodulating is based on a first number (k) of frequencies chosen from a predetermined set of a total number (NF) of frequencies, the first number (k) being larger than 1, and performing quadrature amplitude demodulation of a second number (NQ) on each of the first number (k) of frequencies. The wireless device may be a receiving device, in particular a terminal or user equipment. The method may comprise receiving the signal, e.g. before demodulating.

A wireless device for a wireless communication network is further disclosed. The wireless device is adapted for, and/or may comprise a demodulating module for, demodulating a received signal representing a plurality of input bits (N), wherein demodulating is based on a first number (k) of frequencies chosen from a predetermined set of a total number (NF) of frequencies, the first number (k) being larger than 1, and performing quadrature amplitude demodulation to a second number (NQ) on each of the first number (k) of frequencies. The wireless device may be a receiving device, in particular a terminal or user equipment. The wireless device may be adapted for, and/or comprise a receiving module for, receiving the signal, e.g. before demodulating.

Demodulating may generally comprise mapping a signal to input bits, e.g. based on a demodulation assumption or setting or configuration. The configuration may be received from a network, and/or network node and/or wireless device, in particular from a wireless device from which the signal was received, e.g. a transmitting device. A transmitting device may configure (e.g., as part of a method for operating it), and/or be adapted for, and/or comprise a configuring module for, configuring the wireless device for demodulating, e.g. by determining and/or transmitting a corresponding configuration or allocation data. Demodulating to a second number NQ may refer to demodulating such that a maximum number of NQ may be determined and/or retrieved, and/or that a number of bits representing NQ may be determined and/or retrieved. Demodulating may generally be performed on a symbol, in particular to determine and/or retrieve the bits (N input bits) mapped to the symbol.

Moreover, a program product comprising code executable by control circuitry is disclosed, the code being adapted to cause the control circuitry to control and/or perform any of the methods disclosed herein.

In addition, there is disclosed herein a storage medium storing a program product as disclosed herein and/or storing code executable by control circuitry, the code being adapted to cause the control circuitry to control and/or perform any of the methods disclosed herein.

Generally, k may be larger than 1 and smaller than NF, for example smaller or equal to NF/2.

The predetermined set of frequencies generally may comprise and/or represent one or more shifted carrier frequencies respectively subcarriers for modulation/demodulation of a carrier frequency, in particular FSK modulation/demodulation. The set may be predetermined e.g. according to a standard like LTE, and/or be determined and/or configured, e.g. by a network or network node. Configuring a wireless device may comprise configuring the wireless device for modulating and/or demodulating, e.g. indicating the set of frequencies and/or the frequencies chosen. The latter may in particular be implemented for demodulating. Each frequency (or subcarrier) of the set of frequencies may be referred to as tone.

The predetermined set of frequencies may comprise a total number (NF) of frequencies, and/or subcarriers, and/or frequency shifts. The set of frequencies may be indicated and/or represented or parametrized accordingly.

The total number (NF) may be represented by a number of bits, which may be referred to as the first bit number (N1). The second number NQ may be represented by a number of bits, which may be referred to as the second bit number (N2). The first number (k) may be considered to be equal or smaller than the total number (NF) of frequencies in the predetermined set.

A frequency shift of a carrier frequency may represent a subcarrier and/or a frequency shifted from the carrier frequency to represent a frequency modulation and/or key shift for modulation, e.g. for FSK.

It may be considered that the first number (k) is represented by a bit pattern or sequence and/or associated bits. The bit pattern or sequence or associated bit may index and/or indicate the chosen frequencies and/or a subset or group of k frequencies of the predetermined set, in particular indicating the specific frequencies chosen. The indication and/or indexing may be based on a table, e.g. a predetermined table, in particular one of the tables disclosed herein, which may map the bit pattern or associated bits to specific groups or subsets of frequencies of the predetermined set. The bit pattern may comprise more bits than would be necessary to represent k. In particular, the bit pattern may comprise a number of bits sufficient to represent the number of possible (and/or of a chosen number of subsets, which may be admissible and/or preferred) subsets of k frequencies. The k chosen frequencies may be different from each other. The admissible subsets may be determined based on interference characteristics. For example, it may be considered that the admissible subsets include only combinations of k frequencies which are not direct neighbors of each other (a neighbor being the frequency/cies closest to the neighbored frequency).

It may be considered that the predetermined set of frequencies represents a set of frequency shifts of a carrier frequency and/or subcarriers of the carrier frequency, e.g. for FSK modulation and/or demodulation.

The wireless device further being adapted for configuring the wireless device for the modulating and/or demodulating, in particular configuring based on allocation data, which may be received allocation data and/or allocation data determined by the transmitting device, e.g. based on operation conditions.

Choosing the first number (k) of frequencies may be based on and/or in response to operation conditions.

Configuring the wireless device for modulating and/or demodulating in response to operation conditions may be considered. In some variant, configuring the wireless device, e.g. a transmitting device, may be based on and/or in response to operation conditions, and/or configuring may comprise the wireless device configuring itself. Additionally or alternatively, configuring may comprise configuring the receiving device, e.g. by the transmitting device.

Operation conditions may generally be transmission and/or reception conditions, e.g. determined based on measurements or measurement reports, e.g. in the context of measurements performed by a wireless device, e.g. a receiving device. A measurement report may represent and/or indicate transmission and/or reception conditions. Measurements may be performed based on pilot signals and/or sounding reference signals. Generally, operation conditions may be represented by SIR (Signal-To-Interference Ratio) and/or SINR (Signal-To-Interference and Noise Ration) and/or SNR (Signal-To-Noise Ratio) and/or CSI (Channel State Information) and/or CQI (Channel Quality Information) and/or HARQ (Hybrid-Acknowledgement ReQuest) information and/or any other suitable parameter and/or measurement.

It should be noted that generally a modulating scheme may be reversed for demodulating, such that a modulating scheme may be considered a corresponding demodulating scheme and vice versa.

One example for a modulating scheme which generally may be used for modulating is FQAM—a mixture of Frequency Shift Keying (FSK) and QAM (Quadrature Amplitude Modulation). The approaches described herein may be considered to generalize FQAM, and in this way increase the peak spectrum efficiency compared to FQAM. This modulation scheme may be called Generalized Frequency Shift Keying Quadrature Amplitude Modulation (GFSKQAM).

FQAM is a mixture of FSK and QAM. An input word of N bits is split into N1 bits to select one out of $2^{N1}$ frequencies and N2 bits are used to transmit one constellation point out of a $2^{N2}$-valued modulation symbol on the selected frequency. FIG. 1 shows an example where N1=3 bits are used to select 1 out of 8 frequencies and N2=2 bits are used to select one QPSK constellation point for QAM modulation.

In particular, FIG. 1 shows an example of FQAM with N1=3 bits select 1 out 8 frequencies, N2=2 bits select one QPSK constellation point that is transmitted on the selected frequency.

The peak spectrum efficiency of FQAM is rather low. In $2^{N1}$ frequencies it can transmit N1+N2 bits. As comparison, a QAM transmission system transmitting on all $2^{N1}$ frequencies simultaneously can pack $2^{N1}$N2 bits into the same spectrum.

Instead of selecting one frequency as in FQAM, for Generalized FSKQAM (GFSKQAM) according to the method for operating a wireless device described herein it is proposed to choose or select a group or number k of frequencies from a set of NF frequencies, and to transmit on each of the k chosen or selected frequencies. This increases peak spectral efficiency.

Figure 2:
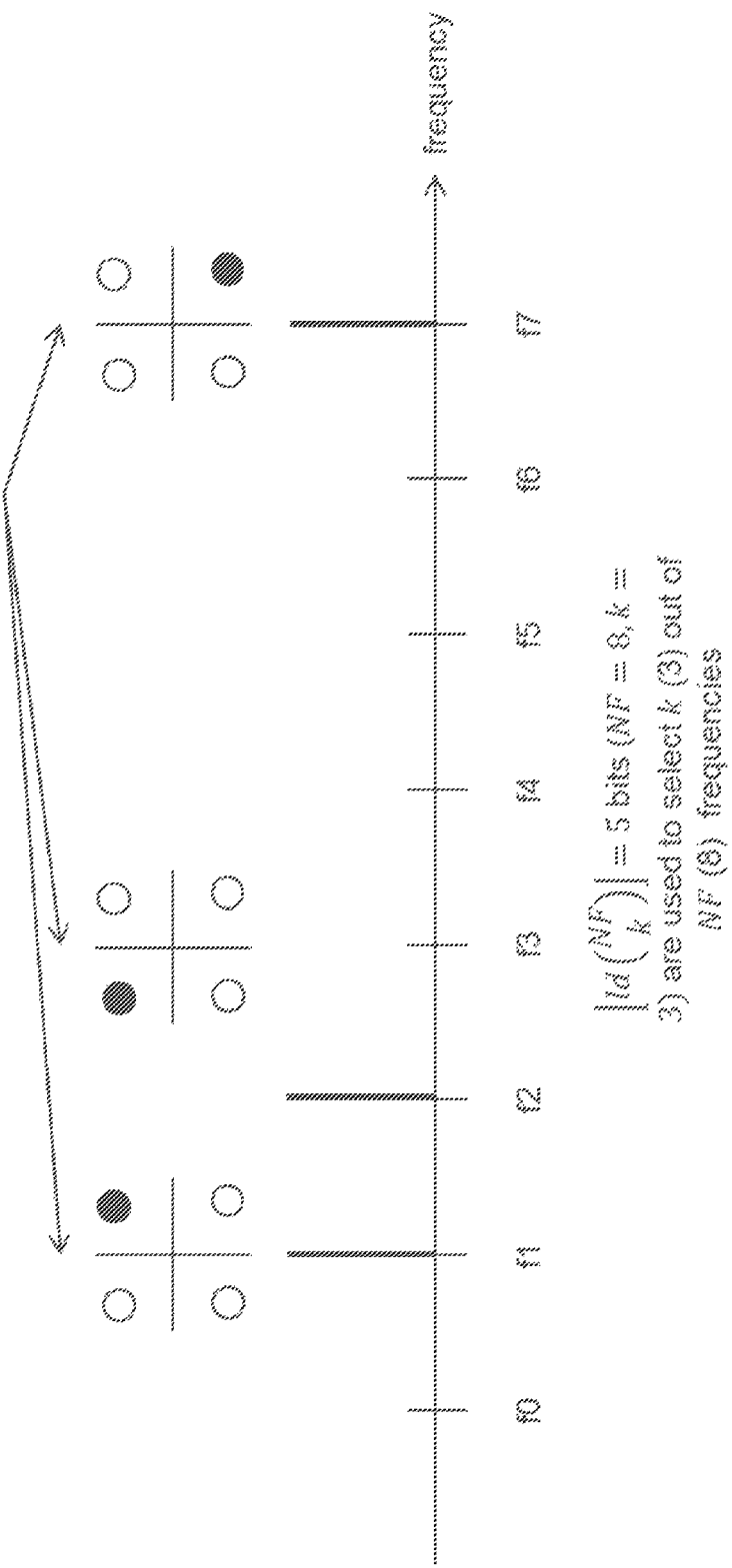
FIG. 2 shows an example of a generalised approach.

Selecting k out of NF frequencies requires $$ld\binom{NF}{k}$$

bits (ld is the logarithm with 2), i.e. just the process of selecting k out of NF frequencies conveys $$ld\binom{NF}{k}$$

bits. Each of the selected frequencies can furthermore carry an NQ-valued constellation (be modulated to NQ), with ld(NQ) bits, the total amount of bits (before rounding to integer bits) in GFSKQAM is therefore $$k \cdot ld(NQ) + ld\binom{NF}{k},$$

which may approximate and/or be equaled to (e.g., after rounding or truncating) the number N of input bits. FIG. 2 shows a graphical demonstration. In particular, FIG. 2 shows Generalized FSKQAM (GFSKQAM) with NQ=4 and NF=8, wherein k=3 frequencies are selected. NQ may generally be a power of 2. In this case, encoding/decoding respectively modulating/demodulating is simplified, since ld(NQ) bits are conveyed on each of the k frequencies and $$\left\lfloor ld\binom{NF}{k} \right\rfloor$$

bits are used to select k frequencies, the total number of bits becomes $$k \cdot ld(NQ) + \left\lfloor ld\binom{NF}{k} \right\rfloor.$$

If ld(NQ) is not integer, it may be considered modulating and/or demodulating the bits over the k frequencies may be jointly. The total number of bits in this case is $$\lfloor k \cdot ld(NQ) \rfloor + \left\lfloor ld\binom{NF}{k} \right\rfloor.$$

Often $$ld\binom{NF}{k}$$

will not be integer, if neither $$ld\binom{NF}{k}$$

nor ld(NQ) is integer. Choosing and/or selection of frequencies can be done jointly with modulation (QAM modulating) of the k chosen frequencies. In this case, the total number of bits (which generally may be the number N of input bits which may be modulated into a symbol using the modulation) becomes $$\left\lfloor k \cdot ld(NQ) + ld\binom{NF}{k} \right\rfloor.$$

If both $$ld\binom{NF}{k}$$

and ld(NQ) are integer the total number of bits is $$k \cdot ld(NQ) + ld\binom{NF}{k}$$

and modulating/demodulating may be done separately for each frequency (of the k chosen frequencies) and/or independent of frequency selection without losing spectrum efficiency.

TABLE 1

Number of bits per NF = 4 subcarriers with FQAM and GFSKQAM

| k | $ld\binom{NF}{k}$ | QPSK Number of bits: $k \cdot ld(NQ) + \left\lfloor ld\binom{NF}{k} \right\rfloor$ | 16QAM | 64QAM |
|---|---|---|---|---|
| 1 (FQAM) | 2 | 4 | 6 | 8 |
| 2 | 2.59 | 6 | 10 | 14 |

TABLE 1-continued

Number of bits per NF = 4 subcarriers with FQAM and GFSKQAM

| k | $ld\binom{NF}{k}$ | QPSK Number of bits: $k \cdot ld(NQ) + \left\lfloor ld\binom{NF}{k} \right\rfloor$ | 16QAM | 64QAM |
|---|---|---|---|---|
| 3 (GFSKQAM) | 2 | 8 | 14 | 20 |
| 4 (GFSKQAM) | 0 | 8 | 16 | 24 |

TABLE 2

Number of bits per NF = 8 subcarriers with FQAM and GFSKQAM

| k | $ld\binom{NF}{k}$ | QPSK Number of bits: $k \cdot ld(NQ) + \left\lfloor ld\binom{NF}{k} \right\rfloor$ | 16QAM | 64QAM |
|---|---|---|---|---|
| 1 (FQAM) | 3 | 5 | 7 | 9 |
| 2 | 4.81 | 8 | 12 | 16 |
| 3 (GFSKQAM) | 5.81 | 11 | 17 | 23 |
| 4 (GFSKQAM) | 6.13 | 14 | 22 | 30 |
| 5 (GFSKQAM) | 5.81 | 15 | 25 | 35 |
| 6 (GFSKQAM) | 4.81 | 16 | 28 | 40 |
| 7 (GFSKQAM) | 3 | 17 | 31 | 45 |
| 8 (GFSKQAM) | 0 | 16 | 32 | 48 |

From table 1 and table 2 it can be seen that the maximum number of bits (corresponding to N) that can be conveyed in NF frequencies increases dramatically when going from FQAM to GFSKQAM (the feasibility of this approach may be dependent on the operation conditions, in particular SINR). The last row is traditional modulation scheme, i.e. no information is carried in frequency selection but all frequencies are used to convey ld(NQ) each. A choice of fewer tones (number of frequencies or subcarriers) may lead to better interference avoidance properties, since the level of other cell interference impinging on the chosen tones is averaged out due to spreading. There is a similar interference suppression that occurs when the modulation is used with MIMO, since different layers do not interfere with each other in every symbol period. This may be a particularly desirable property for MU-MIMO.

Figure 3:
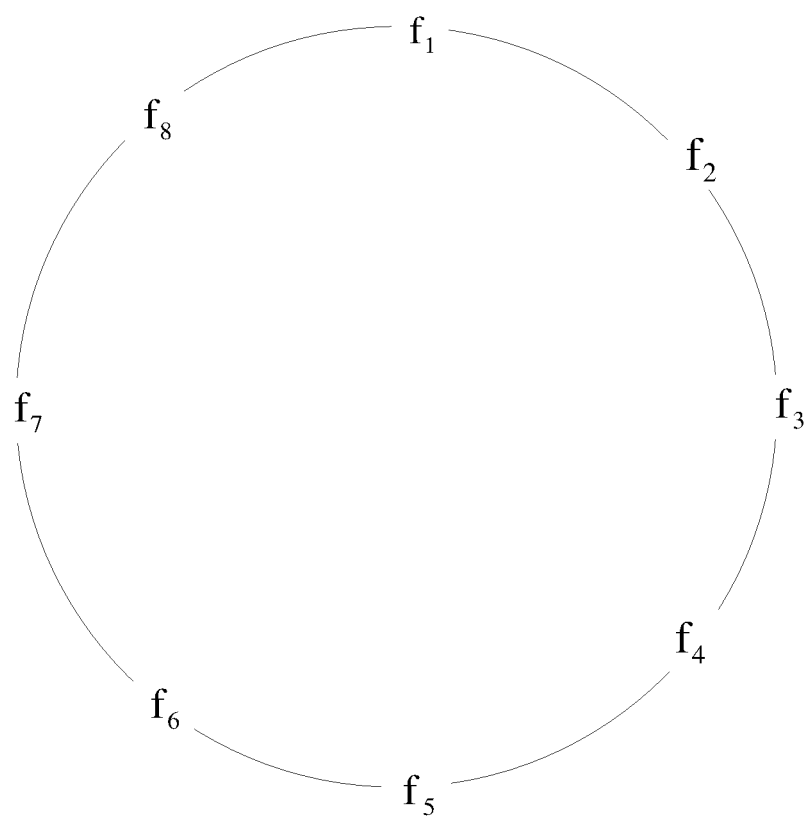
FIG. 3 shows a representation of a predetermined set of frequencies.

One aspect of the modulation design is the mapping between $$\left\lfloor ld\binom{NF}{k} \right\rfloor$$

bits and k frequencies. As an example, consider the case where NF=8 as in Table 2 and k=2. In one realization of the mapping, the 8 frequency tones (of the set of predetermined frequencies) may be represented in a circularly symmetric manner as shown in FIG. 3, wherein f1 to f8 represent the 8 tones or frequencies. The 4 bits (N1) that choose 2 tones may then be mapped onto the arrangement as per the example in table 3.

Table 3 shows a mapping between 4 bits and 16 sets of 2 frequency tones that can be described systematically using a shift of 1 tone or 3 tones between the chosen subcarriers, with the shift determined by the MSB (Most Significant Bit) of the bit pattern or bit sequence; the 16 sets are a fraction of the total number of 28 possible combinations of 2 tones.

| Bit sequence | Tone indices: (i, j) → (f$_i$, f$_j$) |
|---|---|
| 0000 | (1, 2) |
| 0001 | (2, 3) |
| 0010 | (3, 4) |
| 0011 | (4, 5) |
| 0100 | (5, 6) |
| 0101 | (6, 7) |
| 0110 | (7, 8) |
| 0111 | (8, 1) |
| 1000 | (1, 4) |
| 1001 | (2, 5) |
| 1010 | (3, 6) |
| 1011 | (4, 7) |
| 1100 | (5, 8) |
| 1101 | (6, 1) |
| 1110 | (7, 2) |
| 1111 | (8, 3) |

The remaining bits are then used to determine the mapping onto a constellation point of a chosen QAM. It will be clear to a person skilled in the art to extend this representation to generalize the value of k. It is also clear that the mapping provided is only one of several possible combinations.

The number k can be configurable, e.g. depending on the required peak spectrum efficiency or expected SINR range. For example, users at the cell edge (e.g. worse than the 95$^{th}$ percentile) may benefit from the use of lower k, while users closer to the base station may benefit from higher values of k.

A generalization of above method is to allow a variable k, i.e. information is also encoded in the number k itself. Modulating may comprise choosing such a k. The number of bits that can be conveyed in this case is $$\sum_{k \in K} \left( k \cdot ld(NQ) + \left\lfloor ld\binom{NF}{k} \right\rfloor \right)$$

(the floor function might go across the complete summand or a second floor function is required for the first term for non-integer ld(NQ)) assuming modulating/demodulating (encoding/decoding) is done separately for each k value. K may be the set of allowed k values. If modulating/demodulating (encoding/decoding) is done jointly across all k values the number of bits becomes $$\left\lfloor \sum_{k \in K} \left( k \cdot ld(NQ) + ld\binom{NF}{k} \right) \right\rfloor.$$

The concepts herein have been outlined in the context of frequencies, i.e. k out of NF frequencies are selected. More generally, GFSKQAM can be seen that k out of NF resources (resource can e.g. be time, frequency, code, and spatial layer) are used.

Accordingly, any reference herein to frequencies (e.g. NF frequencies in a set, a number k of chosen frequencies, etc.) may be replaced by a reference to a resource, which may be for example a time resource and/or frequency resource and/or code and/or spatial layer), in particular a resource which may be modulated and/or be basis for a modulation.

In a multicarrier system based on OFDM, the addressing of tones for each symbol would be confined to a single Physical resource block (PRB). Thus in the example described above and in the context of table 3, the addressing of tones may be confined to a single resource block composed of 8 subcarriers. Multiple PRBs could be assigned to a transmission with additional bits determining the frequency tone and the QAM constellation point per active frequency tone. The sparse occupation of tones across the system bandwidth could further be enhanced by spreading the assigned PRBs sparsely across the system bandwidth. Data to multiple mobiles (terminals or UEs) would thus be loaded across all the available PRBs. Random loading of PRBs across base stations in the system would create a non-Gaussian interference environment that can be used by novel receiver architectures to provide improved performance.

Figure 4:
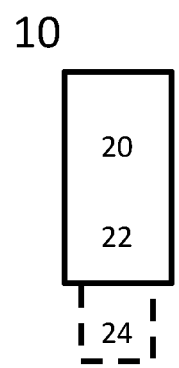
FIG. 4 schematically shows a user equipment or terminal.

FIG. 4 schematically shows a terminal 10 as an example wireless device, which may be implemented in this example as a user equipment. Terminal 10 comprises control circuitry 20, which may comprise a controller connected to a memory. Any of the modules of a terminal described herein may be implemented in and/or executable by, the control circuitry 20, in particular as module in the controller. Terminal 10 also comprises radio circuitry 22 providing receiving and transmitting or transceiving functionality, the radio circuitry 22 connected or connectable to the control circuitry. An antenna circuitry 24 of the terminal 10 is connected or connectable to the radio circuitry 22 to collect or send and/or amplify signals. Radio circuitry 22 and the control circuitry 20 controlling it are configured for cellular communication with a network on a first cell/carrier and a second cell/carrier, in particular utilizing E-UTRAN/LTE resources as described herein. The terminal 10 may be adapted to carry out any of the methods for operating a wireless device or terminal disclosed herein; in particular, it may comprise corresponding circuitry, e.g. control circuitry. Modules of a wireless device as described herein may be implemented in software and/or hardware and/or firmware in corresponding circuitry. The terminal 10 may in particular be a receiving device.

Figure 5:
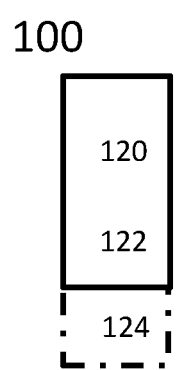
FIG. 5 schematically shows a network node or base station.

FIG. 5 schematically shows a network node or base station 100 as a further example of a wireless device, which in particular may be an eNodeB. Network node 100 comprises control circuitry 120, which may comprise a controller connected to a memory. The control circuitry is connected to control radio circuitry 122 of the network node 100, which provides receiver and transmitter and/or transceiver functionality. An antenna circuitry 124 may be connected or connectable to radio circuitry 122 for signal reception or transmittance and/or amplification. The network node 100 may be adapted to carry out any of the methods for operating a wireless device disclosed herein; in particular, it may comprise corresponding circuitry, e.g. control circuitry. Modules of a wireless device or network node as described herein may be implemented in software and/or hardware and/or firmware in corresponding circuitry. The network node 100 may in particular represent a transmitting device.

Figure 6:
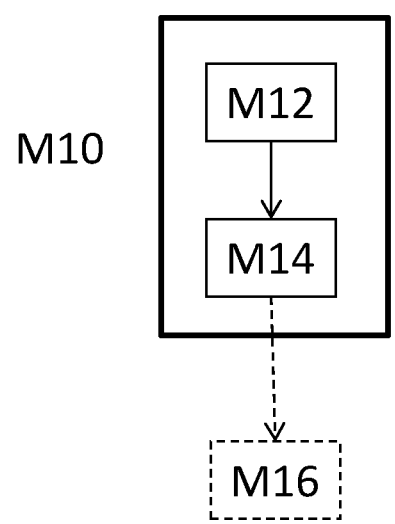
FIG. 6 schematically shows a method for operating a wireless device.

FIG. 6 shows a method for operating a wireless device. The method may comprise an action M10 of modulating a number N of input bits as described herein. M10 may comprise an action M12 of choosing a number k of frequencies from a set of frequencies having NF frequencies, and an action M14 of modulating each of the chosen frequencies with QAM. An optional action M16 may comprise transmitting the signal or symbol resulting from the modulating.

Figure 7:
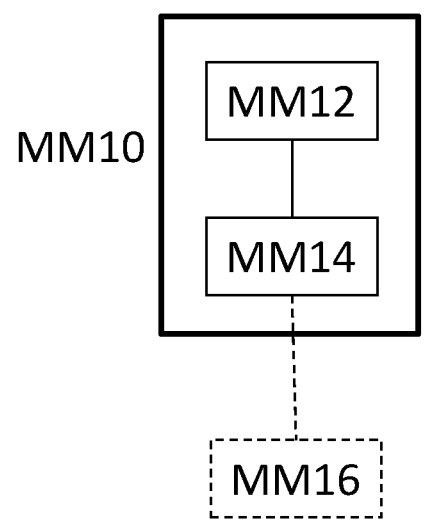
FIG. 7 schematically shows a corresponding wireless device.

FIG. 7 shows a wireless device, which may be a transmitting device. The wireless device, which may e.g. be a terminal 10 or network node 100, may comprise a modulating module MM10 for performing action M10. It may be considered that modulating module MM10 comprises a choosing module MM12 for performing action M12 and/or a QAM module MM14 for performing action M14. The wireless device may optionally comprise a transmitting module MM16 for performing action M16.

Figure 8:
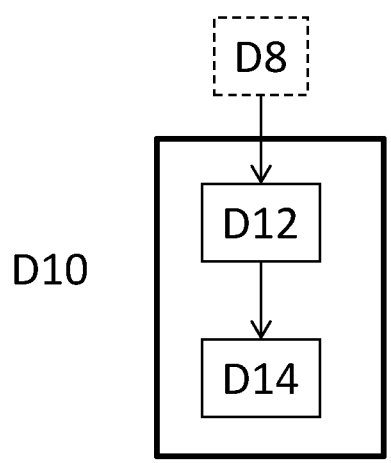
FIG. 8 schematically shows another method for operating a wireless device.

FIG. 8 shows a method for operating a wireless device. The method may comprise an action D10 of demodulating a signal to determine a number N of input bits as described herein. D10 may comprise an action D12 of choosing a number k of frequencies from a set of frequencies having NF frequencies, and an action D14 of demodulating each of the chosen frequencies with QAM to retrieve a number NQ or a corresponding number of bits, which may be the number of bits necessary to represent NQ in binary. The method may optionally comprise action D8 of receiving a signal.

Figure 9:
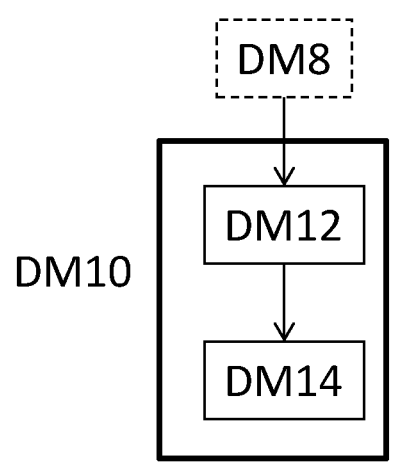
FIG. 9 schematically shows a corresponding wireless device.

FIG. 9 shows a wireless device, which may be a receiving device, e.g. a terminal and/or network node. The wireless device may comprise a demodulating module DM10 for performing action D10. Module DM10 may comprise a choosing module DM12 for performing action D12, and a QAM module DM14 for performing action D14. The wireless device may optionally comprise a receiving module DM8 for performing action D8.

A wireless network, in particular a cellular network, may comprise a wireless device like a network node, in particular a radio network node, which may be connected or connectable to a core network, e.g. a core network with an evolved network core, e.g. according to LTE. A network node may e.g. be a base station. The connection between the network node and the core network/network core may be at least partly based on a cable/landline connection. Operation and/or communication and/or exchange of signals involving part of the core network, in particular layers above a base station or eNB, and/or via a predefined cell structure provided by a base station or eNB, may be considered to be of cellular nature or be called cellular operation. Operation and/or communication and/or exchange of signals without involvement of layers above a base station and/or without utilizing a predefined cell structure provided by a base station or eNB, may be considered to be D2D communication or operation, in particular, if it utilises the radio resources, in particular carriers and/or frequencies, and/or equipment (e.g. circuitry like radio circuitry and/or antenna circuitry, in particular transmitter and/or receiver and/or transceiver) provided and/or used for cellular operation.

A terminal may be implemented as a mobile terminal and/or user equipment. A terminal or a user equipment (UE) may generally be a device configured for wireless device-to-device communication and/or a terminal for a wireless and/or cellular network, in particular a mobile terminal, for example a mobile phone, smart phone, tablet, PDA, etc. A user equipment or terminal may be a node of or for a wireless communication network as described herein, e.g. if it takes over some control and/or relay functionality for another terminal or node. It may be envisioned that terminal or a user equipment is adapted for one or more RATs, in particular LTE/E-UTRA. A terminal or user equipment may generally be proximity services (ProSe) enabled, which may mean it is D2D capable or enabled. It may be considered that a terminal or user equipment comprises radio circuitry and/or control circuitry for wireless communication. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. It may be considered that a terminal or user equipment is configured to be a terminal or user equipment adapted for LTE/E-UTRAN. Generally, a terminal may be adapted for MTC (machine-type communication). Such a terminal may be implemented as or associated to a sensor/sensor arrangement and/or smart device and/or lighting/lighting arrangement and/or remotely controlled and/or monitored device (e.g., smart-meter).

A wireless device like a network node may be a base station, which may be any kind of base station of a wireless and/or cellular network adapted to serve one or more terminals or user equipments, e.g. an eNB. It may be considered that a base station is a node or network node of a wireless communication network. A network node or base station may be adapted to provide and/or define and/or to serve one or more cells of the network and/or to allocate frequency and/or time resources for communication to one or more nodes or terminals of a network. Generally, any node adapted to provide such functionality may be considered a base station. It may be considered that a base station or more generally a network node, in particular a radio network node, comprises radio circuitry and/or control circuitry for wireless communication. It may be envisioned that a base station or network node is adapted for one or more RATs, in particular LTE/E-UTRA. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. A base station may be arranged to be a node of a wireless communication network, in particular configured for and/or to enable and/or to facilitate and/or to participate in cellular communication, e.g. as a device directly involved or as an auxiliary and/or coordinating node. Generally, a base station may be arranged to communicate with a core network and/or to provide services and/or control to one or more user equipments and/or to relay and/or transport communications and/or data between one or more user equipments and a core network and/or another base station and/or be Proximity Service enabled. An eNodeB (eNB) may be envisioned as an example of a base station, e.g. according to an LTE standard. A base station may generally be proximity service enabled and/or to provide corresponding services. It may be considered that a base station is configured as or connected or connectable to an Evolved Packet Core (EPC) and/or to provide and/or connect to corresponding functionality. The functionality and/or multiple different functions of a base station may be distributed over one or more different devices and/or physical locations and/or nodes. A base station may be considered to be a node of a wireless communication network. Generally, a base station may be considered to be configured to be a coordinating node and/or to allocate resources in particular for cellular communication between two nodes or terminals of a wireless communication network, in particular two user equipments.

Configuring a wireless device, in particular a terminal or wireless device or node (network node, e.g. like a eNB or base station), may involve instructing and/or causing the wireless device or node to change its configuration, e.g. at least one setting and/or register entry and/or operational mode. A terminal or wireless device or node may be adapted to configure itself, e.g. according to information or data in a memory of the terminal or wireless device. Configuring a node or terminal or wireless device by another device or node or a network may refer to and/or comprise transmitting information and/or data and/or instructions to the wireless device or node by the other device or node or the network, e.g. allocation data and/or scheduling data and/or scheduling grants. Configuring a terminal may include sending allocation data to the terminal indication which modulation and/or encoding to use. A terminal may be configured with and/or for scheduling data and/or to use, e.g. for transmission, scheduled and/or allocated uplink resources, and/or, e.g. for reception, scheduled and/or allocated downlink resources. Uplink resources and/or downlink resources may be scheduled and/or provided with allocation or configuration data.

A wireless communication network may comprise a radio access network (RAN), which may be adapted to perform according to one or more standards, in particular LTE, and/or radio access technologies (RAT).

A storage medium may be adapted to store data and/or store instructions executable by control circuitry and/or a computing device, the instruction causing the control circuitry and/or computing device to carry out and/or control any one of the methods described herein when executed by the control circuitry and/or computing device. A storage medium may generally be computer-readable, e.g. an optical disc and/or magnetic memory and/or a volatile or non-volatile memory and/or flash memory and/or RAM and/or ROM and/or EPROM and/or EEPROM and/or buffer memory and/or cache memory and/or a database.

Resources or communication resources or radio resources may generally be frequency and/or time resources (which may be called time/frequency resources). Allocated or scheduled resources may comprise and/or refer to frequency-related information, in particular regarding one or more carriers and/or bandwidth and/or subcarriers and/or time-related information, in particular regarding frames and/or slots and/or subframes, and/or regarding resource blocks and/or time/frequency hopping information. Allocated resources may in particular refer to UL resources, e.g. UL resources for a first wireless device to transmit to and/or for a second wireless device. Transmitting on allocated resources and/or utilizing allocated resources may comprise transmitting data on the resources allocated, e.g. on the frequency and/or subcarrier and/or carrier and/or timeslots or subframes indicated. It may generally be considered that allocated resources may be released and/or de-allocated. A network or a node of a network, e.g. an allocation or network node, may be adapted to determine and/or transmit corresponding allocation data indicating release or de-allocation of resources to one or more wireless devices, in particular to a first wireless device.

Allocation data may be considered to be data scheduling and/or indicating and/or granting resources allocated by the controlling or allocation node, in particular data identifying or indicating which resources are reserved or allocated for communication for a wireless device or terminal and/or which resources a wireless device or terminal may use for communication and/or data indicating a modulation or modulation scheme to use, e.g. for demodulation. Allocation data may in particular comprise information and/or instruction regarding a configuration and/or for configuring a terminal, e.g. indicating a scheduling and/or a modulation to use, which may comprise an encoding and/or a number of symbols Q' to be used and/or indicating which frequencies out of a set of frequencies to choose and/or which QAM to use, e.g. for modulation or demodulation.

It may be considered that an allocation node or network node is adapted to transmit allocation data directly to a node or wireless device and/or indirectly, e.g. via a relay node and/or another node or base station. Allocation data may comprise control data and/or be part of or form a message, in particular according to a pre-defined format, for example a DCI format, which may be defined in a standard, e.g. LTE. Allocation data may comprise configuration data, which may comprise instruction to configure and/or set a wireless device like a terminal or user equipment for a specific operation mode, e.g. in regards to the use of receiver and/or transmitter and/or transceiver and/or use of transmission (e.g. TM) and/or reception mode, and/or may comprise scheduling data, e.g. granting resources and/or indicating resources to be used for transmission and/or reception. A scheduling assignment may be considered to represent scheduling data and/or be seen as an example of allocation data. A scheduling assignment may in particular refer to and/or indicate resources to be used for communication or operation.

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other embodiments and variants that depart from these specific details.

For example, the concepts and variants are partially described in the context of Long Term Evolution (LTE) or LTE-Advanced (LTE-A) mobile or wireless communications technologies; however, this does not rule out the use of the present concepts and aspects in connection with additional or alternative mobile communication technologies such as the Global System for Mobile Communications (GSM). While the following embodiments will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the embodiments described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. Because the aspects presented herein can be varied in many ways, it will be recognized that any scope of protection should be defined by the scope of the claims that follow without being limited by the description.

Some abbreviations used are:
FSK Frequency Shift Keying, a modulation method
QAM Quadrature Amplitude Modulation
QPSK Quadrature Phase-Shift Keying, a method used in the context of QAM
16QAM, 64QAM are QAM schemes
FQAM Frequency and Quadrature Amplitude Modulation
LTE Long Term Evolution, a telecommunications standard

The invention claimed is:

1. A method for operating a wireless device in a wireless communication network, the method comprising:
    modulating a plurality of input bits (N), wherein the modulating comprises:
        choosing a first number (k), of frequencies, from a predetermined set of a total number (NF) of frequencies based on operation conditions, the first number (k) being larger than 1,
        determining a particular number of bits, from the plurality of input bits (N), based on the total number (NF) of frequencies and the first number (k) of frequencies,
        selecting k frequencies based on the determined particular number of bits, and
        performing quadrature amplitude modulation to a second number (NQ) on each of the selected k frequencies.

2. The method according to claim 1, wherein the predetermined set of the total number (NF) of frequencies represents a set of frequency shifts of a carrier frequency.

3. The method according to claim 1, wherein the method further comprises configuring the wireless device for the modulating, based on received allocation data.

4. The method according to claim 1, wherein the operation conditions are indicated by at least one of: Signal-To-Interference Ratio (SIR), Signal-To-Interference and Noise Ratio (SINR), Signal-To-Noise Ratio (SNR), Channel State Information (CSI), Channel Quality Information (CQI), and Hybrid-Acknowledgement ReQuest (HARQ) information.

5. A wireless device for a wireless communication network, the wireless device comprising:
    control circuitry configured to modulate a plurality of input bits (N), wherein, to modulate the plurality of input bits (N), the control circuitry is configured to:
        choose a first number (k), of frequencies, from a predetermined set of a total number (NF) of frequencies based on operation conditions, the first number (k) being larger than 1,
        determine a particular number of bits, from the plurality of input bits (N), based on the total number (NF) of frequencies and the first number (k) of frequencies,
        select k frequencies based on the determined particular number of bits, and
        perform quadrature amplitude modulation to a second number (NQ) on each of the selected k frequencies.

6. The wireless device according to claim 5, wherein the predetermined set of the total number (NF) of frequencies represents a set of frequency shifts of a carrier frequency.

7. The wireless device according to claim 5, wherein the control circuitry is configured to modulate the plurality of input bits (N) based on received allocation data.

8. The wireless device according to claim 5, wherein the operation conditions are indicated by at least one of: Signal-To-Interference Ratio (SIR), Signal-To-Interference and Noise Ratio (SINR), Signal-To-Noise Ratio (SNR), Channel State Information (CSI), Channel Quality Information (CQI), and Hybrid-Acknowledgement ReQuest (HARQ) information.

9. A method for operating a wireless device in a wireless communication network, the method comprising:
    demodulating a received signal representing a plurality of input bits (N), wherein the demodulating comprises:
        choosing a first number (k), of frequencies, from a predetermined set of a total number (NF) of frequencies based on operation conditions, the first number (k) being larger than 1,
        determining a particular number of bits, from the plurality of input bits (N), based on the total number (NF) of frequencies and the first number (k) of frequencies,
        selecting k frequencies based on the determined particular number of bits, and
        performing quadrature amplitude demodulation of a second number (NQ) on each of the selected k frequencies.

10. The method according to claim 9, wherein the predetermined set of the total number (NF) of frequencies represents a set of frequency shifts of a carrier frequency.

11. The method according to claim 9, wherein the method further comprises configuring the wireless device for the demodulating, based on received allocation data.

12. The method according to claim 9, wherein the operation conditions are indicated by at least one of: Signal-To-Interference Ratio (SIR), Signal-To-Interference and Noise Ratio (SINR), Signal-To-Noise Ratio (SNR), Channel State Information (CSI), Channel Quality Information (CQI), and Hybrid-Acknowledgement ReQuest (HARQ) information.

13. A wireless device for a wireless communication network, the wireless device comprising:
    control circuitry configured to demodulate a received signal representing a plurality of input bits (N), wherein, to demodulate the received signal, the control circuitry is configured to:
        choose a first number (k), of frequencies, from a predetermined set of a total number (NF) of frequencies based on operation conditions, the first number (k) being larger than 1,
        determine a particular number of bits, from the plurality of input bits (N), based on the total number (NF) of frequencies and the first number (k) of frequencies,
        select k frequencies based on the determined particular number of bits, and
        perform quadrature amplitude demodulation to a second number (NQ) on each of the selected k frequencies.

14. The wireless device according to claim 13, wherein the predetermined set of the total number (NF) of frequencies represents a set of frequency shifts of a carrier frequency.

15. The wireless device according to claim 13, wherein the control circuitry is configured to demodulate the received signal based on received allocation data.

16. The wireless device according to claim 13, wherein the operation conditions are indicated by at least one of:

Signal-To-Interference Ratio (SIR), Signal-To-Interference and Noise Ratio (SINR), Signal-To-Noise Ratio (SNR), Channel State Information (CSI), Channel Quality Information (CQI), and Hybrid-Acknowledgement ReQuest (HARQ) information.

17. A non-transitory computer readable medium storing code executable by control circuitry, the code causing the control circuitry to control and/or perform the method of claim 1.

18. A non-transitory computer readable medium storing code executable by control circuitry, the code causing the control circuitry to control and/or perform the method of claim 9.

* * * * *